United States Patent [19]

Buckman et al.

[11] 4,250,269

[45] Feb. 10, 1981

[54] WATER-SOLUBLE MIXTURES OF QUATERNARY AMMONIUM POLYMERS, NONIONIC AND/OR CATIONIC VINYL-ADDITION POLYMERS, AND NONIONIC AND/OR CATIONIC SURFACTANTS

[75] Inventors: Robert H. Buckman; Philip M. Hoekstra; John D. Pera, all of Memphis, Tenn.

[73] Assignee: Buckman Laboratories, Inc., Memphis, Tenn.

[21] Appl. No.: 97,479

[22] Filed: Nov. 26, 1979

[51] Int. Cl.³ .......................... C08K 5/06; C08K 5/19
[52] U.S. Cl. ............................................ 525/6; 8/496; 8/555; 162/135; 162/167; 260/29.6 NR
[58] Field of Search ............... 525/1, 6; 260/29.6 NR

[56] References Cited

U.S. PATENT DOCUMENTS

| | | | |
|---|---|---|---|
| 2,261,002 | 10/1941 | Ritter | 528/397 |
| 2,271,378 | 1/1942 | Searle | 424/329 |
| 3,014,896 | 12/1961 | Colwell et al. | 526/307 |
| 3,023,162 | 2/1962 | Flordyce et al. | 210/52 |
| 3,055,827 | 9/1962 | Wiley | 210/53 |
| 3,157,595 | 11/1964 | Johnson et al. | 210/54 C |
| 3,170,901 | 2/1965 | Melamed | 526/292 |
| 3,171,805 | 3/1965 | Suen et al. | 210/54 C |
| 3,489,663 | 1/1970 | Bayer et al. | 204/59 |
| 4,054,542 | 10/1977 | Buckman et al. | 528/405 |

*Primary Examiner*—Stanford M. Levin
*Attorney, Agent, or Firm*—Floyd Trimble

[57] ABSTRACT

Water-soluble polymeric mixtures prepared by mixing 1 to 10 parts by weight of a quaternary ammonium polymer with 0.5 to 7 parts by weight of a high molecular weight nonionic and/or cationic vinyl-addition polymer, and 0.1 to 5 parts by weight of a nonionic and/or cationic surfactant have utility in many diverse applications.

14 Claims, No Drawings

WATER-SOLUBLE MIXTURES OF QUATERNARY AMMONIUM POLYMERS, NONIONIC AND/OR CATIONIC VINYL-ADDITION POLYMERS, AND NONIONIC AND/OR CATIONIC SURFACTANTS

This invention relates to water-soluble mixtures of polymers, the preparation thereof, and the uses of these polymeric mixtures in the pulp and paper industry to improve drainage, provide retention of fiber fines, dyes, pigments, fillers, starch, and gum, and to increase strength. In addition, said polymers are useful in dewatering sewage sludge and as resins in the manufacture of electroconductive paper in the sizing of paper and paperboard as well as the separation of minerals in ore processing operations. More particularly, the mixture of polymers of our invention comprises a quaternary ammonium polymer limited to an amino epichlorohydrin condensation polymer or an ionene polymer, a high molecular weight nonionic and/or cationic vinyl-addition polymer, and a nonionic and/or cationic surfactant.

The polymeric mixtures of this invention can also be used to improve aqueous adhesive formulations, as flocculants for the purification of water and the processing of wastes, to improve dyeability and colorfastness in textiles, and to increase the adhesion of water-proofing and flame-proofing finishes to fabrics.

Cationic polymers have been used in the past in the pulp and paper, textile, and water treating industries for the uses described in this invention; but none, however, are entirely satisfactory. Some are useful as retention aids and flocculants but do not provide any of the other desired benefits. Ionene-type polymers which are prepared by reacting di-tertiary amines with dihalo compounds are typically products with relatively low molecular weights. These products may be effective for controlling microorganisms, but their use as flocculants is limited. The most versatile cationic polymers are the polyethylenimines which can be manufactured in various molecular weight ranges by the selection of different catalysts and the use of cross-linking reagents. However, the manufacture of polyethylenimines requires the use of the very toxic monomer ethylenimine, which, in recent years, has been described as a carcinogen, and severe restrictions have been placed on the handling of the monomer in commercial and industrial plants by government regulatory agencies.

The nonionic and cationic vinyl-addition polymers, which are solid and have a high molecular weight, are usually difficult to dissolve in water despite their high solubility in water. When added to water, the solid particles swell and the exterior portions of the particles become covered with a gelatinous water-polymer mixture which retards the movement of water into the particle. As a result, excessive times are required to achieve complete solubility, or else substantial loss in effectiveness in an application area will result from the incompletely dissolved polymer. To alleviate this problem, recent improvements in the art have resulted in the use of more rapidly dissolving water-in-oil emulsions of polyelectrolytes. However, these materials are difficult to handle and tend to separate in the form of a polymer-poor oil phase and in a polymer-rich phase. They contain hydrocarbon oils which are flammable, foul application equipment, and result in cloudy solutions of slow-dissolving polymer when added to water.

It is, therefore, a principal object of this invention to provide water-soluble mixtures of quaternary ammonium polymers with nonionic and cationic vinyl-addition polymers and nonionic and cationic surfactants.

It is another object of our invention to provide methods for improving drainage and increasing retention of fines, dyes, pigments, fillers in starch in the paper making process, as well as increasing strength, improving sizing, and increasing electroconductivity of paper and paperboard.

It is yet another object of our invention to provide methods for improving the dewatering of sewage sludges.

It is yet another object of our invention to provide methods for improving aqueous adhesive formulations.

It is yet another object of our invention to provide methods of flocculating impurities in water and methods of improving processing wastes.

It is yet another object of our invention to provide methods of improving dyeability and color-fastness in textiles and of increasing the adhesion of water-proofing and flame-proofing finishes to fabrics.

These and other objects and advantages of the novel compositions and methods of this invention will become apparent as the description proceeds.

To the accomplishment of the foregoing and related ends, this invention then comprises the features hereinafter fully described and particularly pointed out in the claims, the following descriptions setting forth in detail certain illustrative embodiments of the invention, these being indicative, however, of but a few of the various ways in which the principals of the invention may be employed.

The water-soluble quaternary ammonium polymers of this invention are selected from amine-epichlorohydrin polymers and ionene polymers. The amine-epichlorohydrin polymers are similar in structure to the ionene polymers. The latter are prepared by reacting a dihalo compound with a di-tertiary amine. When ammonia or a primary amine is carefully reacted with epichlorohydrin, a dihalo compound of the following structure is formed first.

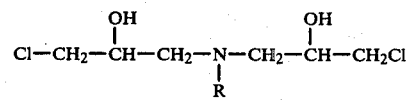

This intermediate can react with itself before it is reacted with a tertiary amine to produce polymers or it can react with a di-tertiary amine to form a polymer in a manner similar to that in the ionene polymer. Thus, this type of polymer can be characterized as a branched ionene polymer.

The cationic water-soluble amine-epichlorohydrin polymers used to prepare the mixtures of this invention are usually prepared in a two-stage reaction process wherein about 1 mole of ammonia is reacted with about 3 moles of epichlorohydrin, or about 1 mole of the primary amine having the formula RNH$_2$ is reacted with about 2 moles of epichlorohydrin, thus forming a polymeric precursor and subsequently reacting said precursor with a tertiary amine having the formula:

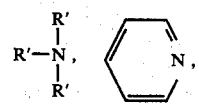

-continued

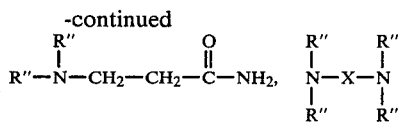

wherein R represents a straight or branch chain alkyl group containing 1 to 20 carbon atoms and 0 to 2 carbon to carbon double bonds, a straight or branch chain alkyl group containing 1 to 6 carbon atoms and 1 or more hydroxyl or chloro substituents, a saturated aryl group or a benzyl group; and wherein each of the R' groups independently represents a straight or branch chain alkyl group containing 1 to 20 carbon atoms and 0 to 2 carbon to carbon double bonds, a straight or branch chain alkyl group containing 1 to 6 carbon atoms and 1 or more hydroxyl or chloro substituents, a saturated aryl group, or a benzyl group; R" represents a straight chain alkyl group containing 1 to 6 carbon atoms; X represents a polymethylene group containing 1 to 12 carbon atoms,

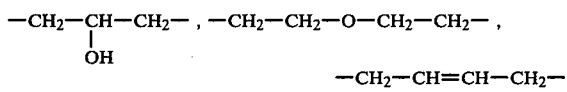

These amine-epichlorohydrin polymeric compositions are described in U.S. Pat. No. 4,054,542.

The ionene-type polymers used in this invention are prepared by reacting a dihalo organic compound with a secondary or a di-tertiary amine. These polymerization processes plus suitable reactions have been described by D. M. Ritter in U.S. Pat. No. 2,261,002; N. E. Searle in U.S. Pat. No. 2,271,378; and J. W. Bayer, et al., in U.S. Pat. No. 3,489,663, which disclosures are hereby made a part of this application.

In addition to the dihalo organic compounds disclosed in the foregoing references, other suitable dihalo compounds are those having the formula:

$$A-(Y)_m-Z-(Y)_n-A$$

wherein A represents Br, Cl; Y represents a $CH_2$ group and/or a substituted $CH_2$ group wherein one of the hydrogens thereof is replaced by alkyl or hydroxymethyl; and m and n independently represent integers varying from 1 to 10. Z represents:

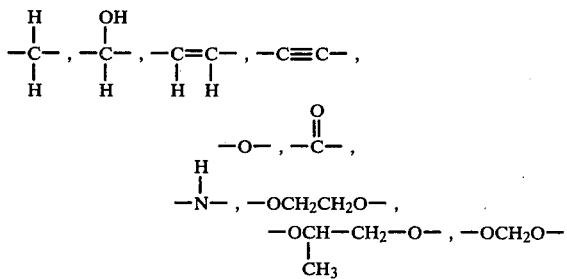

and arylene.

Although, as indicated above, either a secondary or a di-tertiary amine may be used in the process, we generally prefer to use a di-tertiary amine as the dihalo organic compounds react directly with such amines to form a polyquaternary product. If a secondary amine is used, the dihalo compound reacts with the amine to form a di-tertiary amine salt which upon neutralization undergoes polymerization with an additional quantity of the dihalo compound. The reaction between the dihalo compound and the amine is conducted in the presence of an inert solvent. Water is the preferred solvent. A suitable reaction temperature varies from 50° to 100° C.

The nonionic vinyl addition polymers that are suitable components of the mixtures of this invention are the polymers and copolymers of acrylamide and methacrylamide having a molecular weight in excess of one million.

The high molecular weight cationic vinyl-addition polymers employed in the invention are also characterized by molecular weights greater than about one million. Examples of these polymers are the homopolymers and water-soluble copolymers of N-vinyl pyridine, ethylenically unsaturated mono, di, or trialkyl ammonium salts, such as vinylbenzene trimethyl ammonium chloride, aminoethyl acrylate hydrochloride, N-methylamino ethylacrylate, N,N-dimethylaminoethyl methacrylate, N,N-dimethylaminomethyl-N-acrylamide, N,N-dimethylaminoethyl-N-acrylamide and the like. Preferred are polymers containing a plurality of aminoalkyl nitrogen-substituted acrylamide mers wherein the aminoalkyl substituent is hydrophilic, e.g., contains less than about 8 carbons.

Useful cationic vinyl-addition polymers generally include the copolymers of U.S. Pat. No. 3,014,896, ester copolymers of U.S. Pat. No. 3,023,162, vinylbenzyl quaternary ammonium homopolymers and copolymers of U.S. Pat. No. 3,055,827. The copolymers of half amides of U.S. Pat. No. 3,157,595, novel quaternary compounds of U.S. Pat. No. 3,170,901, and in general any of the polymers of U.S. Pat. No. 3,171,805 of a sufficient molecular weight to be characterized herein as high molecular weight polymers.

We have found that mixtures of quaternary ammonium polymer with the vinyl-addition polymers in water will produce a non-homogeneous mixture which contains undissolved gelatinous particles or separates into two layers on standing. However, when the proper amount of surfactant is added, the mixture becomes a clear to opalescent solution or a smooth uniform cloudy and stable solution or emulsion.

We have found that the nonionic surfactants which are suitable as components of the mixtures of this invention are the condensation products of alkyl substituted phenols or primary and secondary alkyl alcohols with from 6 to 18 moles of ethylene oxide. Examples of the alkyl groups of the phenols are octyl, nonyl, and dodecyl. The alkyl groups of the primary and secondary alcohols should contain from 6 to 18 carbon atoms. Other nonionic surfactants suitable are the block polymers of from 4 to 30 moles of ethylene oxide with from 10 to 30 moles of propylene oxide.

Cationic surfactants which can be used to provide the mixtures of these inventions are the quaternary ammonium chlorides such as the alkyltrimethylammonium chlorides, alkylbenzyldimethyl ammonium chlorides, alkyldimethylethylbenzylammonium chlorides wherein the alkyl groups contain from 10 to 18 carbon atoms. Quaternized imidazolines containing substituent alkyl groups of 10 to 18 carbon length are also effective surfactants. Alkylamines and their condensation products with from 3 to 10 moles of ethylene oxide wherein the alkyl groups contain 10 to 18 carbon atoms are also suitable for the preparation of the mixtures of this invention.

The polymer mixtures of this invention can be prepared by simply blending the low molecular weight amine-epichlorohydrin cationic polymer or ionene polymers and the high molecular weight addition polymers with the surfactant in water. Heat may be applied to facilitate the mixing. The polymers may be added as particulate solids, as solutions, or as emulsions. However, we prefer the use of the solutions and emulsions because of the long time required to solubilize the solids in these mixtures. The aqueous solutions of the amine-epichlorohydrin polymers usually contain from about 10 percent to about 50 percent or more by weight of polymeric solids. The polymer mixtures of the invention will contain from 1 to about 10 percent of the amine-epichlorohydrin polymer or ionene polymer on a solid polymer basis, from 0.5 to about 7 percent of the high molecular weight vinyl-addition polymer, and from 0.1 to 5 percent of the surfactant. The solvent is usually water, although in some cases small quantities of alcohols or glycols may be added to reduce the freezing point of these mixtures. These mixtures are readily soluble in water by simply adding the polymer mixture to the diluent water and using a minor amount of agitation to obtain solution.

This invention provides a process for the preparation of paper or paperboard wherein an aqueous fluid containing cellulosic pulp and other papermaking ingredients is formed into a sheet on a fourdrinier wire cloth, one of the polymer mixtures of this invention being added to the aqueous fluid before the furnish contacts the fourdrinier wire cloth. Thus, the polymeric compositions of our invention are useful as drainage aids, formation aids, retention aids, sizing agents, and as strength improving agents for paper and paperboard, as well as resins. When these polymer mixtures are used as papermaking aids for manufacture of electroconductive paper, one or more of them may, for example, be added continuously to the paper machine system at suitable locations such as the machine chest, the fan pump, or the headbox at concentrations ranging from 0.05 to 2 percent based on the weight of the dry pulp. The desirable results obtained by using these processes may be summarized as follows:

1. Increased production per unit of equipment;
2. Improved formation and strength properties of paper and paperboard;
3. Increase in overall mill efficiency in that losses of dyes, fine fibers, pigments, fillers, starch, and other paper components are minimized by increasing retention of these products in paper and paperboard; and
4. Alleviation of water pollution problems by using the polymers in the recovery of the valuable materials remaining in the process waters of paper and pulp manufacture.

These polymeric compositions can also be used to remove dissolved or solid particulate matter remaining in the water before it is discharged even though such matter is not of a character suitable for use but must be disposed of by microbiological decomposition or combustion, or buried in a sanitary fill.

These polymeric compositions according to the invention are useful in the treatment of incoming water supplies. These compositions are fast-acting flocculants and will achieve a reduction in process time in addition to the desired degree of completeness in the removal of finely divided or dissolved solids. Similar principles apply to the removal of dissolved and particulate matter from water discharged as industrial or municipal effluents.

According to a further feature of the invention, there is provided a method of flocculating solids from an aqueous system which comprises adding to the aqueous system one or more of these polymer mixtures, as hereinbefore described, in an amount sufficient to cause flocculation of the solids. One or more of the water-soluble polymer mixtures may be added to a given aqueous suspension with sufficient agitation to insure uniform distribution. Following this treatment, the flocculated aggregates will settle. The amount of the water-soluble polymer mixture necessary to produce the desired result is highly variable depending on the amount and nature of the particulate matter on which an effect is needed as well as the other components of the ionic environment in which the polymers and particulate matter are present. Suitable quantities of the mixtures of this invention may vary from as low as 0.1 part per million, based on the total weight of water and particulate matter, to as high as 25 parts per million on the same basis with a preferred range of from 0.5 to 5 parts per million.

In modern sewage treatment plants and in other industrial processes, is is often necessary to separate organic and/or inorganic solids from aqueous solutions by filtration. Most often the suspended solids in these systems bear a negative charge. Therefore, the highly cationic polymer mixtures of this invention are readily adsorbed on the particles and cause flocculation and agglomeration of the suspended solids, thus facilitating the separation of these solids from the water.

The cationic nature of the water-soluble polymers also serves to provide increased effectiveness in aqueous adhesive formulations. This is accomplished by utilizing the strong positive charge of the polymers in electrostatic bonds or by utilizing the non-polar bonding characteristics of the polymers to adhesive materials and surfaces that do not actually bear charges strong enough to form electrostatic bonds. For example, the adhesive bond of polyethylene to paper is significantly increased by treating the adhesive that is applied to the paper with small amounts of the cationic polymer mixtures of this invention.

In the textile industry, the same effects that make these polymers useful in paper manufacture apply to various operations used for the processing of cotton textiles. The affinity of the polymers for the cellulose as well as for various dyes, pigments, and finishes will improve the retention to the fibers as well as increase the resistance of the treated fabric to leaching and other processes which reduce the effectiveness of the cotton additive. The polymers are less effective in providing these effects with synthetic fibers but the polymers of the invention still possess some utility. In particular, the cationic polymers are useful in providing antistatic properties to synthetic textile products as well as fabrics made from natural fibers.

In order to disclose the nature of the present invention still more clearly, the following illustrative examples will be given. It is to be understood, however, that the invention is not to be limited to the specific conditions or details set forth in these examples except insofar as such limitations are specified in the appended claims.

Parts as used herein and in the appended claims are parts by weight.

EXAMPLE 1

A glass-lined jacketed reactor was charged with 600 parts of n-propanol and 800 parts of 50 percent aqueous methylamine. The solution was cooled and 2424 parts of epichlorohydrin was added at a temperature of 35° C. When the reaction was completed, 272 parts of concentrated sulfuric acid was added. The reactor was then charged with 2007 parts of water and 2275 parts of an aqueous solution containing 60 percent of N,N,N',N'-tetramethylethylenediamine. The mixture was heated at 70°–75° C. until the reaction was very viscous at which point it was diluted with 7678 parts of water. The mixture was then reheated until the viscosity increased again and the polymerization was then stopped by adding 402 parts of sulfuric acid and 298 parts of water. The final solution contained 25 percent of polymer solids.

EXAMPLE 2

An ionene polymer was prepared by mixing 4592 parts of N,N,N',N'-tetramethylethylenediamine and 6543 parts of water, heating the solution obtained to reflux and slowly adding 5500 parts of bis(2-chloroethyl)ether. After heating the reaction mixture at reflux for six hours, the concentration was adjusted to 60 percent concentration of poly[oxyethylene(dimethyliminio)ethylene(dimethyliminio)ethylene dichloride] by distillation of water from the product.

EXAMPLE 3

The ionene polymer, poly[hydroxyethylene(dimethyliminio)ethylene(dimethyliminio)methylene dichloride], was prepared by mixing 375 parts of an aqueous solution containing 60 percent of N,N,N',N'-tetramethylethylenediamine (TMEDA) and 4496 parts of muriatic acid (31.5 percent HCl) at a temperature below 50° C. While the temperature was maintained at 40°–50° C. by cooling, 3588 parts of epichlorohydrin was added. The mixture was further agitated for one-half hour and then heated to 60°–70° C. at which temperature it was maintained while 3750 parts of additional aqueous solution of TMEDA was added. The concentration was adjusted to 60 percent polymer solids by distilling some of the water from the product.

EXAMPLE 4

A high molecular weight polyacrylamide was prepared in a mixture of deionized water, medium boiling paraffinic hydrocarbon oil and nonionic surfactants. The polymerization was initiated with 2,2'-azobis(isobutyronitrile) and the temperature was maintained at 46°–48° C. for three hours. After this first stage polymerization was complete, additional monomer, surfactant and water were added and a second stage polymerization was completed. The final product contained approximately 35 percent of polyacrylamide which had a reduced viscosity of about 20 dl per g.

EXAMPLE 5

A process similar to that described in Example 4 was run using a mixture of acrylamide monomer and dimethylaminoethyl methacrylate methosulfate at a weight ratio of 87.5 to 12.5. The final product contained approximately 35 percent of the cationic copolymer which had a reduced viscosity of about 13 dl per g.

EXAMPLE 6

The cationic amine-epichlorohydrin polymer prepared in Example 1 was mixed with the nonionic vinyl-addition polymer prepared in Example 4, with water, and with a commercial surfactant manufactured from dodecylphenol and nine moles of ethylene oxide. These mixtures were prepared by adding the cationic polymer to water containing 0.5 g of the surfactant and heating to 50° C. The polyacrylamide mixture and sufficient water to bring the total weight to 100 g was added and stirring was continued until the mixture was smooth and uniform. The mixtures described in Table 1 were prepared using this procedure.

TABLE 1

| | Cationic Polymer solution Percent | Polyacrylamide mixture Percent | Surfactant Percent | Water Percent |
|---|---|---|---|---|
| A | 5 | 4 | 0.5 | 90.5 |
| B | 10 | 2 | 0.5 | 87.5 |
| C | 10 | 4 | 0.5 | 85.5 |
| D | 15 | 3 | 0.5 | 81.5 |
| E | 15 | 3 | 0.0 | 82.0 |
| F | 20 | 4 | 0.5 | 75.5 |

All of these were smooth, slightly opaque products except E which contained lumps of polymer that could not be dissolved in the product.

EXAMPLE 7

The cationic amine-epichlorohydrin polymer prepared in Example 1 was mixed with the cationic vinyl-addition copolymer prepared in Example 5, with water, and with a commercial surfactant manufactured from dodecylphenol and nine moles of ethylene oxide. These mixtures were prepared by adding both polymer mixtures to water, stirring well, and then adding 0.5 grams of the surfactant. The final weight of the mixture was 100 g. Stirring was continued until the mixture was smooth and uniform. The mixtures described in Table 2 were prepared using this procedure.

TABLE 2

| | Cationic Polymer solution Percent | Cationic Copolymer mixture Percent | Surfactant Percent | Water Percent |
|---|---|---|---|---|
| A | 5.0 | 5 | 0.5 | 89.5 |
| B | 7.5 | 6 | 0.5 | 86.0 |
| C | 10.0 | 5 | 0.5 | 84.5 |
| D | 10.0 | 6 | 0.5 | 83.5 |
| E | 10.0 | 6 | 0.0 | 84.0 |
| F | 15.0 | 5 | 0.5 | 79.5 |
| G | 20.0 | 2 | 0.5 | 77.5 |

All of the mixtures were smooth, opaque stable mixtures except E which contained lumps of polymer which could not be dispersed or dissolved.

EXAMPLE 8

The ionene polymer prepared in Example 2 was mixed with the nonionic vinyl-addition polymer prepared in Example 4, with water, and with a commercial surfactant prepared from dodecylphenol and nine moles of ethylene oxide. These mixtures were prepared by adding the cationic polymer to water containing 0.5 g of the surfactant and heating to 50° C. The polyacrylamide mixture and sufficient water to bring the total weight to 100 g was added and stirring was continued until the mixture was smooth and uniform. The mixtures included in Table 3 were prepared using this procedure.

TABLE 3

| | Cationic Polymer solution Percent | Polyacrylamide mixture Percent | Surfactant Percent | Water Percent |
|---|---|---|---|---|
| A | 5 | 5.0 | 0.5 | 89.5 |
| B | 10 | 6.0 | 0.5 | 83.5 |
| C | 15 | 4.5 | 0.5 | 80.0 |
| D | 20 | 5.0 | 0.5 | 74.5 |
| E | 25 | 4.0 | 0.5 | 70.5 |
| F | 25 | 4.0 | 0.0 | 71.0 |

All of these products were smooth and stable except F which contained lumps of polymer that could not be dispersed or dissolved.

EXAMPLE 9

The ionene polymer prepared in Example 2 was mixed with the cationic vinyl-addition copolymer prepared in Example 5, with water, and with a commercial surfactant manufactured from dodecylphenol and nine moles of ethylene oxide. These mixtures were prepared by adding both polymer mixtures to water, stirring well, and then adding 0.5 g of the surfactant. The amount of water was adjusted to give a total weight of 100 g. Stirring was continued until the mixture was smooth and uniform. The mixtures included in Table 4 were prepared using this procedure.

TABLE 4

| | Ionene Polymer solution Percent | Cationic Polymer mixture Percent | Surfactant Percent | Water Percent |
|---|---|---|---|---|
| A | 10 | 4 | 0.5 | 85.5 |
| B | 10 | 5 | 0.5 | 84.5 |
| C | 10 | 6 | 0.5 | 83.5 |
| D | 15 | 5 | 0.5 | 79.5 |
| E | 20 | 4 | 0.5 | 75.5 |
| F | 20 | 6 | 0.5 | 73.5 |

EXAMPLE 10

The ionene polymer prepared in Example 3 was mixed with the nonionic vinyl-addition polymer prepared in Example 4, with water, and with a commercial surfactant manufactured from dodecylphenol and nine moles of ethylene oxide. These mixtures were prepared by adding the ionene polymer to water containing 0.5 g of the surfactant and heating to 50° C. The polyacrylamide and sufficient water to bring the total weight to 100 g was added and stirring was continued until the mixture was smooth and uniform. The mixtures included in Table 5 were prepared using this procedure.

TABLE 5

| | Ionene Polymer solution Percent | Polyacrylamide mixture Percent | Surfactant Percent | Water Percent |
|---|---|---|---|---|
| A | 10 | 4 | 0.5 | 85.5 |
| B | 10 | 5 | 0.5 | 84.5 |
| C | 15 | 4 | 0.5 | 80.5 |
| D | 15 | 6 | 0.5 | 78.5 |
| E | 20 | 4 | 0.5 | 75.5 |
| F | 20 | 5 | 0.5 | 74.5 |

EXAMPLE 11

The ionene polymer prepared in Example 3 was mixed with the cationic vinyl-addition copolymer prepared in Example 5, with water, and with a commercial surfactant manufactured from dodecylphenol and nine moles of ethylene oxide. These mixtures were prepared by adding both polymer mixtures to water, stirring well, and then adding 0.5 g of the surfactant. The amount of water was adjusted to give a total weight of 100 g. Stirring was continued until the mixture was smooth and uniform. The mixtures included in Table 6 were prepared using this procedure.

| | Ionene Polymer solution Percent | Cationic Copolymer mixture Percent | Surfactant Percent | Water Percent |
|---|---|---|---|---|
| A | 10 | 6 | 0.0 | 84.0 |
| B | 10 | 4 | 0.5 | 85.5 |
| C | 10 | 5 | 0.5 | 84.5 |
| D | 10 | 6 | 0.5 | 83.5 |
| E | 20 | 4 | 0.5 | 75.5 |
| F | 20 | 6 | 0.5 | 73.5 |

All of these products were smooth and uniform except A which contained polymer lumps that could not be dispersed or dissolved.

EXAMPLE 12

Mixture D of Example 6 and mixture C of Example 7 were repeated using the following surfactants instead of that derived from dodecylphenol and nine moles of ethylene oxide:

Condensation products from
Octylphenol and 9–10 moles of ethylene oxide
Octylphenol and 12–13 moles of ethylene oxide
Nonylphenol and 7–8 moles of ethylene oxide
Nonylphenol and 15 moles of ethylene oxide
Secondary alcohol ($C_{11}$ to $C_{15}$) and 9 moles of ethylene oxide
Primary alcohol ($C_{12}$ to $C_{15}$) and 9 moles of ethylene oxide
Primary alcohol ($C_{12}$ to $C_{15}$) and 12 moles of ethylene oxide
Thirty moles of ethylene oxide and 43 moles of propylene oxide
Twenty-six moles of ethylene oxide and 23 moles of propylene oxide
Hexadecyltrimethylammonium chloride
Alkyl ($C_{12}$ to $C_{16}$) benzyldimethylammonium chloride
Decylamine
Condensation product of alkyl ($C_{16}$ to $C_{18}$) amine and 5 moles of ethylene oxide
Condensation product of alkyl ($C_{12}$ to $C_{16}$) amine and 5 moles of ethylene oxide
Dimethyloctadecylamine

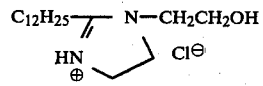

EXAMPLE 13

The polymeric mixtures of this invention were tested for their effectiveness in drainage improvement of paper pulp slurries. The test was conducted with a Canadian Standard Freeness Tester. The furnish used in these tests was a 70/30 blend of bleached hardwood and bleached softwood kraft pulps refined at 1.5 percent consistency in a Valley laboratory beater for 25 minutes. At that point, clay and titanium dioxide were added to provide 7.5 and 2.5 percent respectively based on the weight of the pulp present. The furnish was diluted to 0.5 percent consistency and brought to a pH of about 5 by the addition of alum at a concentration of 20 pounds of $Al_2(SO_4)_3.14H_2O$ per ton of solids.

One liter of the 0.5 percent slurry from above was treated with sufficient solution of the polymer mixture to provide the concentrations indicated in Table 7. The mixture was agitated for 15 seconds and poured through the apparatus. The increases in the number of milliliters of liquid collected are included in Table 7.

TABLE 7

| | | Polymer Mixture Use rate | Canadian Standard Freeness | |
|---|---|---|---|---|
| | | Pounds per ton | Control | Treated |
| Example | Product | of pulp | Milliliters | |
| 6 | D | 8 | 134 | 226 |
| 7 | A | 16 | 128 | 232 |
| 7 | B | 16.7 | 125 | 250 |
| 7 | C | 16 | 128 | 239 |
| 7 | C | 20 | 125 | 251 |
| 7 | D | 14.3 | 139 | 210 |
| 7 | F | 14.3 | 139 | 203 |
| 8 | C | 8 | 134 | 216 |
| 9 | F | 8 | 134 | 213 |
| 10 | A | 8 | 134 | 183 |

EXAMPLE 14

The flocculating properties of the polymer mixtures of this invention were determined using a mixture of pulp and clay. The procedure was as follows.

An 800-ml beaker was charged with 550 ml of water, and 50 ml of a slurry containing 0.3 gram of groundwood spruce pulp and 0.5 gram of kaolin clay. The pulp and clay had been dispersed by agitating stock solutions with a Waring blender. A paddle turning at 100 R.P.M. was then inserted into the beaker and a solution of alum sufficient to provide 40 p.p.m. of $Al_2(SO_4)_3.14H_2O$ and a solution of polymer mixture to be tested were added at one minute intervals. The mixture was agitated for one minute and the paddles were then slowed to 10 R.P.M. Observations of the settling rates of the clay and pulp were made after one and five minutes. The paddles were then stopped and the mixture allowed to stand for ten minutes before the final observations were made.

The flocculatory properties and the clarity of the test mixtures were graded on a scale of 0 to 10 (10 is perfect) after the various time periods. Several products listed in the foregoing Examples were tested with the following results.

TABLE 8

| Example | Product | Concentration of Polymer Mixture Used (parts per million) | Flocculation 1 min. | Flocculation 5 min. | Clarity 1 min. | Clarity 5 min. |
|---|---|---|---|---|---|---|
| 6 | C | 20 | 9 | 9 | 7 | 7 |
| 6 | D | 15 | 9 | 9 | 8 | 7 |
| 6 | F | 15 | 9 | 9 | 7 | 7 |
| 7 | B | 20 | 8 | 9 | 7 | 8 |
| 7 | C | 20 | 9 | 10 | 6 | 7 |
| 7 | D | 20 | 8 | 8 | 6 | 7 |
| 8 | C | 20 | 8 | 8 | 7 | 7 |
| 9 | F | 20 | 8 | 7 | 5 | 4 |
| 10 | A | 20 | 8 | 8 | 7 | 7 |
| 11 | D | 30 | 3 | 3 | 1 | 6 |
| Untreated | Control | — | 0 | 0 | 0 | 0 |

EXAMPLE 15

The polymeric mixtures of this invention were tested for their effectiveness in the retention of total solids in the paper pulp slurry described in Example 13. The method used was similar to that described by Britt, K. W., "Mechanisms of Retention During Paper Formation," TAPPI 56(10), 46–50 (Oct. 1973).

The apparatus used was a dynamic drainage jar which is equipped with an agitator to provide controlled turbulence and high dynamic shear. The dynamic drainage jar consists of two parts. The sample to be tested is added to an upper chamber which has a capacity of one liter. The bottom chamber is an air chamber used to prevent the sample from leaving the upper chamber. The two chambers are separated by a screen coated with electrodeposited nickel and containing conical perforations of 0.003-inch diameter in such number as to provide 14.5 percent open area. The agitator in the upper chamber is a two-inch propeller driven by a variable speed synchronous motor. The speed of the agitator was maintained at 1000 R.P.M. in all of the tests.

In these tests, 500 ml of the 0.5 percent paper pulp slurry was mixed with the required amount of polymeric retention aid in the upper chamber. The mixture was agitated one minute and the stopper in the bottom chamber was then removed. The sample then filtered through the screen and after 50 ml had passed through the screen a sample was collected for analysis. One hundred milliliters of this sample was vacuum filtered through a tared Whatman No. 42 filter paper. This paper was dried in a 110° C. oven and weighed to determine percent total solids in the filtrate.

Data representing percent total solids in the filtrate was collected for control runs (no retention aid used) and for each retention aid under study at each desired treatment rate. Several mixtures of polymers described in the foregoing examples were tested using this procedure and the results are summarized in Table 9. ("Improvement in Retention" is the percent reduction of solids in the filtrate due to addition of the polymer mixture.)

TABLE 9

| Example | Product | Use Rate Pounds per ton of pulp | Improvement in Retention Percent |
|---|---|---|---|
| 6 | D | 16 | 61 |
| 7 | A | 14.3 | 56 |
| 7 | B | 16 | 71 |
| 7 | C | 14.3 | 61 |
| 7 | D | 14.3 | 68 |
| 7 | F | 14.3 | 60 |
| 8 | C | 16 | 58 |
| 9 | F | 16 | 52 |
| 10 | A | 16 | 39 |

While particular embodiments of the invention have been described, it will be understood, of course, that the invention is not limited thereto since many modifications may be made, and it is, therefore, contemplated to cover by the appended claims any such modifications as fall within the true spirit and scope of the invention.

The invention having thus been described, what is claimed and desired to be secured by Letters Patent is:

1. A composition of matter comprising in admixture about 1 to about 10 parts of a quaternary ammonium polymer selected from the group consisting of an amine-epichlorohydrin condensation polymer and an ionene polymer, about 0.5 to about 7 parts of a vinyl-addition polymer selected from the group consisting of nonionic and cationic vinyl-addition polymers, and about 0.1 to about 5 parts of a surfactant selected from the group consisting of nonionic and cationic surfactants.

2. The composition of claim 1 wherein the amine-epichlorohydrin condensation polymer is prepared from methylamine, epichlorohydrin, and N,N,N',N'-tetramethylethylenediamine.

3. The composition of claim 1 wherein the amine-epichlorohydrin condensation polymer is prepared from ethylamine, epichlorohydrin, and N,N,N',N'-tetramethylethylenediamine.

4. The composition of claim 1 wherein the ionene polymer is prepared from bis(2-chloroethyl)ether and N,N,N',N'-tetramethylethylenediamine.

5. The composition of claim 1 wherein the ionene polymer is prepared from N,N'-bis(3-chloro-2-hydroxypropyl)-N,N,N',N'-tetramethylethylenediammonium dichloride and N,N,N',N'-tetramethylethylenediamine.

6. The composition of claim 1 wherein the nonionic vinyl-addition polymer is a polyacrylamide.

7. The composition of claim 1 wherein the cationic vinyl-addition polymer is a copolymer of acrylamide and dimethylaminoethylmethacrylate methosulfate.

8. The composition of claim 1 wherein the nonionic surfactant is the condensation product of dodecylphenol and ethylene oxide in the molar ratio of 6 to 18 moles of ethylene oxide per mole of dodecylphenol.

9. The composition of claim 1 wherein the nonionic surfactant is the condensation product of octylphenol and ethylene oxide in the molar ratio of 6 to 18 moles of ethylene oxide per mole of octylphenol.

10. The composition of claim 1 wherein the nonionic surfactant is the condensation product of nonylphenol and ethyl oxide in the molar ratio of 6 to 18 moles of ethylene oxide per mole of nonylphenol.

11. The composition of claim 1 wherein the cationic surfactant is alkylbenzyldimethylammonium chloride further characterized in that the alkyl group contains from 10 to 18 carbon atoms.

12. The composition of claim 1 wherein the amineepichlorohydrin condensation polymer is prepared from methylamine, epichlorohydrin and N,N,N',N'-tetramethylethylenediamine; the vinyl-addition polymer is polyacrylamide; and the surfactant is the condensation product of dodecylphenol and ethylene oxide in the molar ratio of 9 moles of ethylene oxide per mole of dodecylphenol.

13. The composition of claim 1 wherein the amineepichlorohydrin condensation polymer is prepared from methylamine, epichlorohydrin, and N,N,N',N'-tetramethylethylenediamine; the cationic vinyl-addition polymer is the copolymer derived from acrylamide and dimethylaminoethylmethacrylate methosulfate; and the surfactant is the condensation product of dodecylphenol and ethylene oxide in the molar ratio of 9 moles of ethylene oxide per mole of dodecylphenol.

14. A method of increasing the adhesive properties of water-soluble adhesives which comprises adding to said adhesives the composition of claim 1 in an amount sufficient to achieve the desired increase in adhesive properties.

* * * * *